United States Patent [19]

Hutt

[11] Patent Number: 5,099,577

[45] Date of Patent: Mar. 31, 1992

[54] RELEASABLE KNIFE AXLE FOR TUBE CUTTER

[76] Inventor: Heinz Hutt, 472, Place Closse, Ile Bizard, Canada, H9C 1Y6

[21] Appl. No.: 686,403

[22] Filed: Apr. 17, 1991

[51] Int. Cl.⁵ .................... B23D 21/06; B26D 3/16
[52] U.S. Cl. ......................................... 30/101; 30/97
[58] Field of Search ............... 30/101, 102, 93, 94, 30/95, 96, 97, 347; 166/55

[56] References Cited

U.S. PATENT DOCUMENTS

| | | |
|---|---|---|
| 2,300,139 | 10/1942 | Stein . |
| 2,739,381 | 3/1956 | Petersen . |
| 2,824,772 | 2/1958 | Petersen . |
| 2,921,369 | 1/1960 | Stanley . |
| 3,216,110 | 11/1965 | Stallings . |
| 3,335,492 | 8/1967 | Spiro ................................. 30/101 |
| 3,795,051 | 3/1974 | Feamster, III . |
| 4,078,304 | 3/1978 | Netzel ................................ 30/101 |
| 4,402,136 | 9/1983 | Rast .................................... 30/101 |
| 4,769,911 | 9/1988 | Araki .................................. 30/97 |
| 4,831,732 | 5/1989 | Garton ............................... 30/101 |

FOREIGN PATENT DOCUMENTS

| | | |
|---|---|---|
| 60683 | 4/1921 | Canada . |
| 354163 | 11/1935 | Canada . |
| 2003542 | 5/1990 | Canada . |

*Primary Examiner*—Douglas D. Watts
*Assistant Examiner*—Paul Heyrana, Jr.
*Attorney, Agent, or Firm*—Pierre Lespérance

[57] ABSTRACT

A tube cutter consisting of two frame portions or jaws, being pivoted to one another at their end portions, and further interconnected at their intermediate poritons by a large bolt through which the jaws will move relative to one another about their common pivot. The free end of one jaw carries anvil rollers, and the other jaw free end carries a discoid knife, the anvil roller and knife cooperating in tangentially cutting a tube extending transversely between the jaws free ends. The knife is freely caried by a jaw axle, which is itself freely releasably engaged through the jaw. A spring-loaded band within the knife containing jaw casing frictionally yet releasably locks the knife axle, and thus the knife, in position, by engaging a diametrally smaller portion of the knife axle.

8 Claims, 3 Drawing Sheets

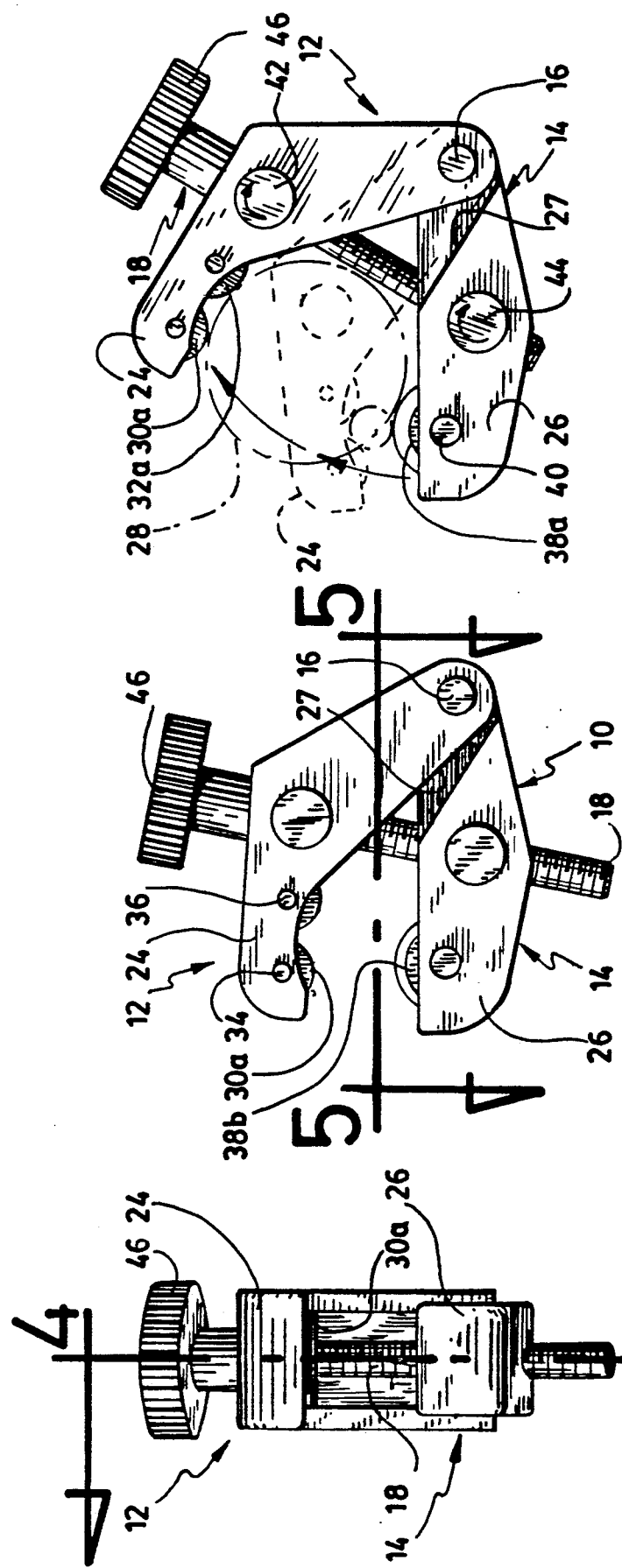

RELEASABLE KNIFE AXLE FOR TUBE CUTTER

FIELD OF THE INVENTION

This invention relates to manual tools used for making clean, transverse cuts about metallic tubes and the like, and used mainly by plumbers.

BACKGROUND OF THE INVENTION

Existing manual tube cutters already disclose screw means for adjusting the tube cutter as a function of the diameter of a tube to be cut: see for instance Canadian patents 60,683 and 354,163. Moreover, adjustment of the tube cutter anvil rollers has been anticipated in the published Canadian patent application No. 2,003,542, and adjustment of the tube cutting knife itself, in U.S. Pat. No. 3,795,051. The latter patent, together with U.S. Pat. No. 2,739,381 further disclose means for relatively quick release of the knife from the tube cutter. Other relevant documents include the following U.S. Pat. Nos. 2,300,139; 2,824,772; 2,921,369; and 3,216,110.

In these known pipe cutting tools in which the cutting knife is releasable, the means to releasably secure the knife to the tool are usually of the screw type or the snap ring type. The screw type, illustrated in FIG. 6 of the Stein patent (U.S. Pat. No. 2,300,139), involves the knife axle itself being releasably screwed to the cutter frame. The snap ring type, embodied in one of the above-referenced Peterson patents (U.S. Pat. No. 2,739,381) involves installing a split snap ring, reference 18 in FIG. 2 of this latter patent, which will expand into locking engagement with a tangential groove about one end of the knife carrying axle.

Such known knife axle lock means for cutting tools are deemed by the inventor as being clumsy and not as efficient as one would like.

OBJECTS OF THE INVENTION

The gist of the invention is to increase the convenience in use of a manual tube cutter, by providing simple, easy means for replacing the worn out knife.

A general object of the invention is to decrease the long-term operating cost of manual tube cutters.

An object of the invention is to increase the efficiency of existing tube cutter knife axle lock means.

SUMMARY OF THE INVENTION

In accordance with the objects of the invention, there is disclosed a cutting tool for transversely sectioning rigid, substantially cylindrical tubular members, comprising: (a) first and second, elongated, jaw members; (b) pivot means, pivoting said jaw members about one end thereof for relative motion about a pivot plane; (c) biasing means, to move said jaw members relative to one another about said pivot means, within said pivot plane; (d) anvil roller members, rotatively carried by the end of said first jaw member opposite said one end thereof for rotation within said common plane; and (e) a knife member, rotatively carried by the end of said second jaw member opposite said one end thereof for rotation within said common plane about a knife axle, said knife member lodged within a second jaw member open chamber, said knife member facing said anvil roller members and said knife axle extending through a channel made transversely of said second jaw member; a pipe to be cut destined to engage between said jaw members and to be engaged by said anvil roller members and said knife member; wherein said cutting tool further includes a knife axle lock means, to releasably lock the knife axle and knife member to said second jaw member whereby, upon disengagement of said lock means, said knife axle is released slidingly lengthwisely from said channel and said knife member is thereafter released while said knife member remains within said second jaw member open chamber.

BRIEF DESCRIPTION OF THE DRAWINGS

FIG. 1 is a side elevation of the tube cutter in the partially open mouth position;

FIG. 2 is an elevation of the tube cutter, about the mouth portion thereof;

FIG. 3 is a view similar to FIG. 1, but in the fully open mouth position, and illustrating in dotted lines the play of the cutter jaws about a cylindrical tube to be cut;

DETAILED DESCRIPTION OF THE INVENTION

Figure 4:
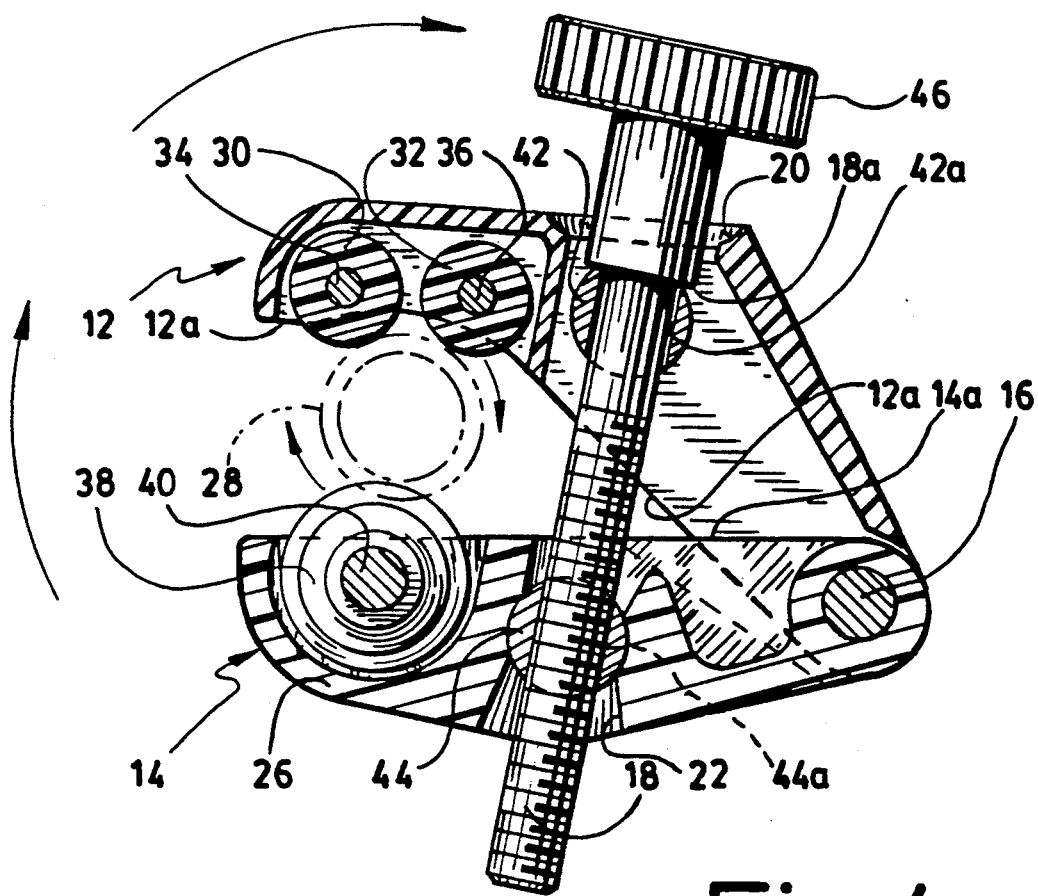
FIGS. 4 and 5 are enlarged sectional views about lines 4—4 of FIG. 2 and 5—5 of FIG. 1, respectively.

The tube cutter 10 consists of two jaw members 12, 14, pivotally endwisely interconnected about pivot axle 16 by endwise ears 17, 19. A large rigid bolt 18, made preferably of heat treated steel, extends threadedly through a lengthwisely intermediate portion of jaws 12, 14, right through bores 20, 22 respectively. Jaws 12, 14 further define corresponding free end legs 24, 26, at the opposite end from pivot axle 16.

As clearly seen in FIG. 2, jaws 12-14, including parts 24 and 26, are coplanar, while pivot axle 16 is transverse to the plane of jaws 12 and 14. Thus, upon pivotal movement of jaws 12, 14 about the jaws pivot axle 16, the jaws outer legs 24, 26 will move within a common plane, relative to one another. A cylindrical tube 28 is destined to be sectioned when engaged between jaws legs 24 and 26.

More particularly, a first jaw 12 has a generally arcuate shape, while second jaw 14 is substantially straight. Each jaw 12, 14 forms a hollow casing with an open side 12a, 14a facing the other jaw. The side walls of casing 14 are widthwisely tapering toward endwise pivot 16, as clearly shown at 27 in FIGS. 1 and 3, to enable the other jaw 12 to partially engage into the hollow of casing 14 in order to bring opposite (outer) legs 24 and 26 toward each other, up to contact therebetween. Casings 12 and 14 are made from a sturdy material, e.g. high quality, injected Nylon thermoplastic.

Figure 7:
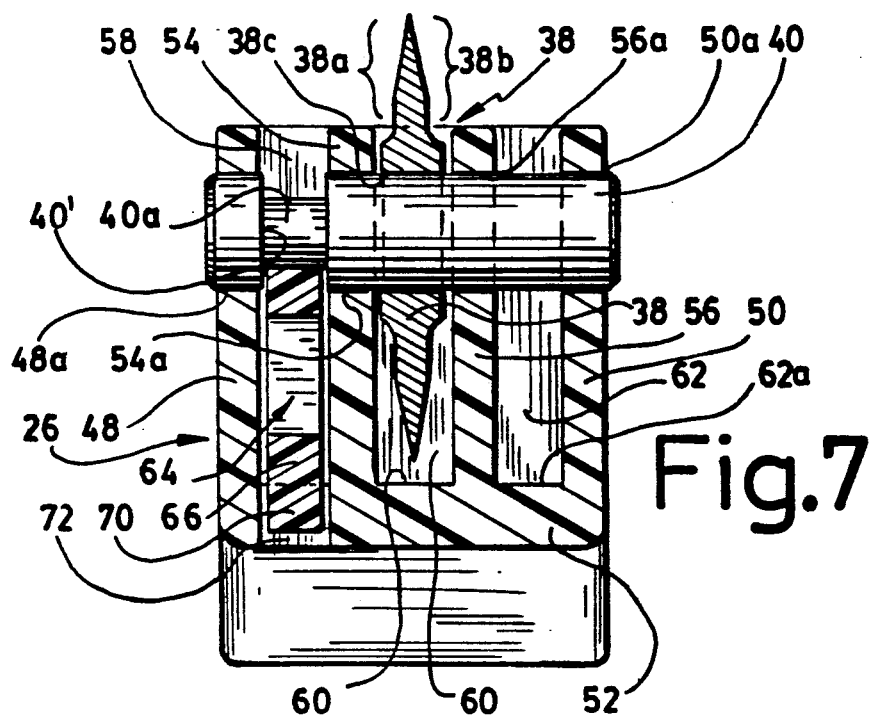

Two tube-guiding, anvil rollers 30, 32, are carried by jaw leg 24, in axially spaced fashion, and within the hollow of leg 24, through pivot axles 34 and 36 respectively, the ends of which are flattened or riveted to prevent their removal from casings 12, 14. Rollers 30, 32 are preferably made from Nylon thermoplastic. A rigid cutting wheel or disc 38, preferably made from heat-treated steel, is further carried by the other jaw leg 26, within its hollow, through a pivot axle 40. Cutting wheel 38 has a bevelled, sharpened, yet sturdy peripheral edge 38b (FIG. 7). Pivot axles 16, 34, 32, 36 and 40 are parallel to one another.

Each anvil roller 30 or 32 and the cutting wheel 38, have an arcuate, sector-shape section 30a, 32a, 38a, respectively, which project outwardly from the corresponding jaw hollow, beyond the plane of the corresponding open sides or mouth 12a and 14a of jaws 12, 14.

As illustrated in FIGS. 3 and 4, bolt 18 extends transversely freely through a transverse, upper channel 42a and threadedly through a transverse, lower, threaded channel 44a, respectively made transversely of two cylindrical bodies 42 and 44, which bodies extend rotatively transversely of casing 12 and 14 respectively and which are located intermediately thereof about coaxial bores 20 and 22 respectively.

Preferably, bolt 18 includes an oversized head 46, carried at one end thereof e.g. about angled jaw 12, to constitute a manual knob for facilitating manual screwing of bolt 18. Knob 46 and bolt 18 are made in one piece, preferably made from nylon thermoplastic.

As clearly shown in FIG. 4, the stem of bolt 18 is countersunk adjacent its head 46, to define an annular seat 18a destined to come in abutting contact with upper cylinder 42. Accordingly, the jaws 12 and 14 of the cutting device 10 will be able to open and close more rapidly than it both cylindrical bodies 42, 44 would have been threaded, since by unscrewing head 46, upper jaw 12 will be able to move freely toward as well as away from lower jaw 14. Indeed, relative displacement of jaws 12, 14 will not be limited to an inversely symmetrical fashion, as would have been the case if through channels 42, 44 would undesirably have been inversely threaded.

It is understood from FIG. 4 that tube 28 is conventionally cut by axially rotating the tool relative to the tube while progressively bringing jaws legs 24 and 26 toward each other, this being done by screwing bolt 18 manually with knob 46. Rollers 30, 32 and cutter disc 38 thus form a registering triangular arrangement which abuttingly retains tube 28 between legs 24 and 26 during rotation of the tool 10. Sharpened edge 38b of cutter wheel 38 then progressively tangentially cut tube 28 in successive cut-out spiralling layers, upon incremental, step by step rotations of the tool 10 and of forcible screwing of knob 46 to bring jaws outer legs 24 and 26 to compressingly abut against tube 28.

Preferably, jaws 12 and 14 are of such dimensions as to enable contention thereof with a single hand, while the operator's other hand can screwingly manipulate knob 46.

Figure 5:
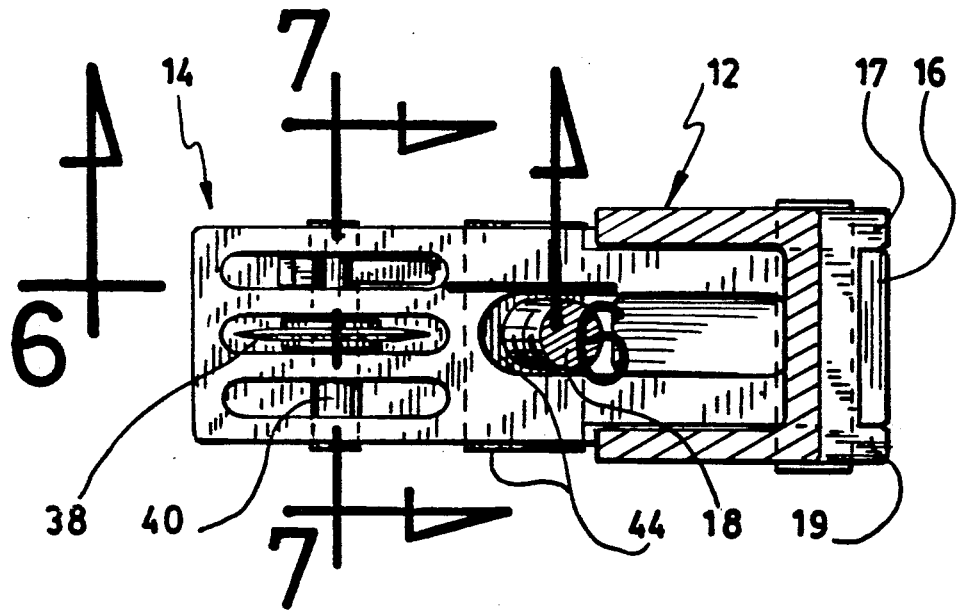
Figure 6:
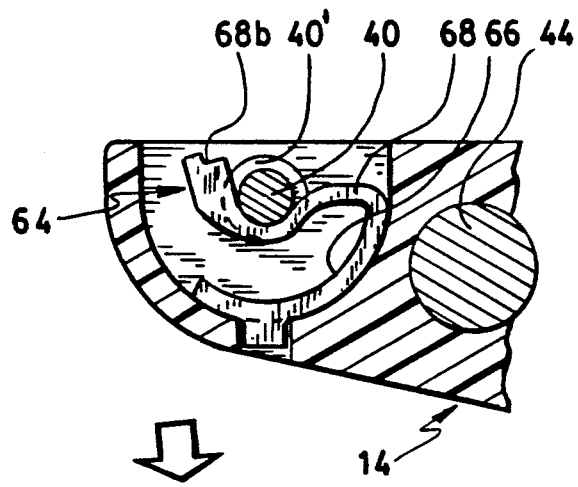
FIGS. 6 and 7 are sectional views, at an enlarged scale, of lines 6—6 and 7—7 respectively of FIG. 5.
Figure 6A:
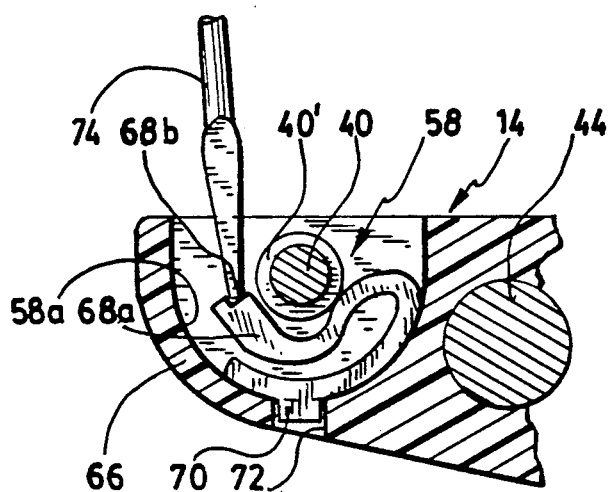
FIG. 6a is a view similar to FIG. 6, but showing how, by using a screwdriver head, the operator can release the cutter wheel axle lock.

In accordance with the teachings of the invention, the cutter wheel 38 is mounted to the outer leg 26 of the lower jaw 14, in a specific way. Having reference to FIG. 5 and especially to FIGS. 6, 6a and 7, lower jaw leg 26 is shown to consist of two opposite side walls 48, 50 and a base web 52 joining the side walls 48 and 50. Two partition walls 54 and 56 are further mounted integral to web 52, parallel to side walls 48 and 50 and spaced therefrom and from one another, so as to define three cavities 58, 60 and 62 (FIG. 7). Each jaw side wall 48, 50 and partition wall 54, 56 therefore includes an intermediate transverse, through-bore 48a, 50a, 54a and 56a respectively, for free, lengthwise, sliding motion as well as free axial rotational engagement of axle 40 thereabout.

Cavity 62 is not essential (it only reduces the weight of tool 10). Cavities 58 and 60 are of substantially same dimensions, and transversely register with one another. Each cavity 58, 60 define a concave flooring, referenced as 58a and 60a.

Cutter wheel 38 is lodged into intermediate cavity 60, being axially engaged around an intermediate section of axle 40 for free rotation thereabout, i.e. that wheel 38 is not fixed to shaft 40 but can rotate around same. Axle 40 may or may not itself rotate during rotation of cutter 38: this is not critical to the invention. But of necessity, cutter disk 38 clears the walls of its cavity 60, including flooring 60a, during rotation thereof.

Axle 40 includes a diametrally smaller end portion 40a. Axle portion 40a has a length approximately equal to the width of side cavity 58, and is destined to come in register therewith. When axle portion 40a registers with jaw cavity 58, the opposite ends of axle 40 project outwardly from the jaw side walls 48 and 50, as shown in FIG. 7.

A spring-loaded, resilient, curved band 64 is mounted into jaw cavity 58, between axle 40 and flooring 58a. Band 64 forms an irregular, roughly U-shape, with a first concave leg 66 seating freely against the concave flooring 58a of cavity 58, and with a second leg 68 overlying the first leg 66. Second leg 68 defines an intermediate curved portion 68a, being curved concavely toward the first leg 66.

The concave seat 68a of spring-loaded band 64 is destined to wrap around the lower section portion of axle portion 40a, under the transverse bias applied by the spring-loaded base leg 66 abutting against the flooring 58a of cavity 58, to form an axle lock. Thus, when upper band leg 68 engages the diametrally smaller axle portion 40a, in register with cavity 58, axle 40 is prevented from slidingly lengthwisely disengaging from lower jaw leg 26, by releasing the through-bores 48a, 54a, 56a and 50a (successively). This is because the body of upper band leg 68 forms a seat, against which the two opposite annular sections 40', 40' of axle 40 which are sidewise of diametrally smaller axle portion 40a, will stop any lengthwise displacement of axle 40, if one tries to pull or push the axle 40 out from lower jaw 14.

However, this axle lock arrangement is easily releasable. Indeed, in view of replacing a worn out cutter disc 38 (where its sharpened edge 38b would be damaged), the operator simply has to push the free end of the upper band leg 68, away from axle 40 and toward lower band leg 66, enough to clear the full diameter of axle 40 (FIG. 6a); then slidingly lengthwisely pulling out or pushing out axle 40 completely outwardly from jaw 14; then removing the worn out cutting disk 38 from its cavity 58 where it has remained; then engage a fresh cutting disk 38 inside the cutting disk cavity 58; and finally, engage same axle 40 back into bores 48a, 54, through the axial bore 38c of cutting disk 38, and through bores 56a and 50a.

Preferably, means are provided to prevent band 64 from sliding around shaft 40, within cavity 58, away from flooring 58a. These means may be e.g. an ear 70, laterally depending from an intermediate portion of lower concave band leg 66 and engaging—forcibly (but releasably) under its spring bias—a mating notch or alternately an aperture 72, being made into flooring 58a.

Preferably also, the free end of upper band leg 68 is notched at 68b, for engagement by a screwdriver head 74 (FIG. 6a) to facilitate manipulation of the band upper leg by forcible disengagement of the upper band concave seat 68a away from axle 40.

All axles 16, 34, 36, 40, 42 and 44 are preferably made from rustproof, tool steel.

I claim:

1. A cutting tool for transversely sectioning rigid, substantially cylindrical tubular members, comprising:
   (a) first and second, elongated, jaw members;
   (b) pivot means, pivoting said jaw members about one end thereof for relative motion about a pivot plane;
   (c) biasing means, to move said jaw members relative to one another about said pivot means, within said pivot plane;
   (d) anvil roller members, rotatively carried by the end of said first jaw member opposite said one end thereof for rotation within said common plane; and
   (e) a knife member, rotatively carried by the end of said second jaw member opposite said one end thereof for rotation within said common plane about a knife axle, said knife member lodged within a second jaw member open chamber, said knife member facing said anvil roller members and said knife axle extending through a channel made transversely of said second jaw member; a pipe to be cut destined to engage between said jaw members and to be engaged by said anvil roller members and said knife member; wherein said cutting tool further includes a knife axle lock means, to releasably lock the knife axle and knife member to said second jaw member;
   wherein said knife axle lock means includes: (a) a diametrally reduced annular section of said knife axle; and (b) a spring-loaded, resilient, elongated member, mounted within said open chamber and defining a first section, abutting against a seat portion defined within said second jaw chamber, and a second section, tangentially abutting against said axle diametrally reduced annular section to prevent lengthwise displacement of said axle; forcible displacement of said second section toward said first section, against the spring load of said elongated member, enabling release of said knife axle from said channel.

2. A cutting tool as defined in claim 1, wherein said second section defines a notched free end, for engagement by a screwdriver head to facilitate disengagement of the spring-loaded rigid member from said knife axle.

3. A cutting tool as defined in claim 1, further including anchoring means, releasably anchoring said axle lock means first section to said chamber seat portion.

4. A cutting tool as defined in claim 1, wherein said jaw chamber defines a concave flooring and wherein said spring-biased member is a spring loaded plastic band, forming roughly an irregular U-shape, with said first portion thereof being concave and conforming to said jaw chamber concave flooring.

5. A cutting tool as defined in claim 4, wherein said axle-engaging band second portion further defines a curved intermediate portion being curved toward said band first portion, so as to define an arcuate seat engaging wrappingly around a lower sector-shape portion of said diametrally restricted annular axle portion, under the bias of its spring-loaded resiliency.

6. A cutting tool as defined in claim 5, wherein said band second portion defines a notched free end lip, for engagement by a screwdriver head to manually push same away from said axle to release the latter from its said jaw channel slidingly lengthwisely therethrough.

7. A cutting tool as defined in claim 5, wherein said band first portion defines about an intermediate section thereof an ear, said ear releasably engaging a mating cavity made into said chamber flooring under the bias of the band spring-loaded resiliency.

8. A cutting tool for tangentially sectioning a pipe, comprising first and second rigid jaw members endwisely interconnected by a pivot axle for pivotal motion about a cutting plane, screw means to forcibly and adjustably draw toward one another the free ends of said jaw members opposite said pivot axle, anvil roll means carried about said first jaw member free end and knife means carried about said second jaw member free end, wherein said second jaw member forms an open casing through which extends a knife carrying axle; and further including a knife axle lock means, consisting in a spring-loaded U-shape band, defining a first leg abutting against a seat within said second jaw casing, and a second leg abutting tangentially against a diametrally reduced section of said knife axle, wherein said axle lock means releasably locks said knife axle to said second jaw casing, and thus, prevents release of said knife from said knife axle and second jaw casing.

* * * * *